May 16, 1967 L. T. SKEGGS 3,320,148
METHOD AND APPARATUS FOR ELECTROPHORETIC DENSITY
GRADIENT SEPARATION AND ANALYSIS
Filed Dec. 4, 1961 4 Sheets-Sheet 3

INVENTOR.
LEONARD T. SKEGGS
BY *Harry Cole*

ATTORNEY

United States Patent Office 3,320,148
Patented May 16, 1967

3,320,148
METHOD AND APPARATUS FOR ELECTRO-
PHORETIC DENSITY GRADIENT SEPARA-
TION AND ANALYSIS
Leonard T. Skeggs, Cleveland, Ohio, assignor to Technicon Instruments Corporation, Chauncey, N.Y., a corporation of New York
Filed Dec. 4, 1961, Ser. No. 156,583
27 Claims. (Cl. 204—180)

This is a continuation-in-part of application Ser. No. 822,830 filed June 25, 1959, now abandoned and application Ser. No. 95,253 filed Mar. 13, 1961, now abandoned.

This invention relates to an automatic electrophoresis analysis apparatus and a method for automatic electrophoresis analysis of a sample liquid or of a series of samples of an ampholyte or a mixture of ampholytes, for example, but without limitation a protein or a mixture of proteins, or other liquids subject to electrophoretic separation. While useful for other purposes, the apparatus of the present invention is especially valuable for the separation of the blood serum proteins, for instance into the fractions albumin, alpha globulin, beta globulin and gamma globulin and their subfractions.

The fractionation of the plasma proteins by electrophoresis is referred to, for example, in Practical Psychological Chemistry by Hawk, Oser and Summerson, 12th edition, published in 1947. As there described, the electrophoretic separation of the proteins of a plasma sample is based on the differences in mobility of the various protein ions under the influence of a potential gradient, as a result of which the more highly charged albumin ions migrate at a faster rate than the globulin ions.

A primary object of the invention is to provide an automatic electrophoresis analysis apparatus having a cell in which a substantially smooth continuously variable density gradient is established in the cell simultaneously with the introduction of the sample liquid into the cell by introducing the sample liquid as a flowing stream along with a plurality of streams of buffers, of predetermined different densities, and introduced into the cell at different liquid levels and in such manner that the sample liquid is disposed in the cell in the form of a thin layer at a predetermined level in relation to the resulting smooth continuously variable density gradient.

In accordance with the presently preferred mode of practicing this invention, after the stream of sample liquid and the several streams of buffer are introduced into the cell to form the density gradient and the thin layer of sample liquid, the liquid flow is interrupted, an electric potential is applied to the liquid to produce the electrophoretic fractionation of the sample liquid, and the fractionated liquid sample is scanned by ultra-violet light, in the case of proteins, and a recorder is operated in response to the scanning operation. This cycle is repeated for each liquid sample with intervening flushing of the cell between successive samples accomplished pursuant to another object of the invention by transmitting streams of the buffer through the cell and part of the next sample liquid between successive cycles.

Another object is to provide a continuous electrophoresis analysis apparatus with an automatic programming device in a system for controlling the operation of the apparatus and for rendering its operation automatic for the performance of electrophoretic fractionation on a series of samples in succession with concomitant analysis and recordings of the fractionation of each sample.

Another object of the invention is the provision of improved means for automatically scanning each fractionated sample in the electrophoresis cell and to provide a scanning method whereby the sample is scanned in the cell prior to its fractionation by the applied voltage and a plurality of times during the application of the voltage.

The above and other objects, features and advantages of the invention will be fully understood from the following description considered in connection with the accompanying illustrative drawings of the presently preferred embodiment of the invention.

Referring now to the drawings in detail, the apparatus of the present invention comprises an electrophoresis cell 10 provided with chambers 12 and 14 for an electrolyte and with an intermediate chamber 16 into which a plurality of buffer solutions, of different densities, and the samples are transmitted for analysis of the liquid under investigation. The buffer solutions and the samples are introduced into chamber 16 and the tubes through which the liquids flow are closed adjacent the inlets and outlets of the chamber to interrupt the flow of the liquid in the chamber during electrophoretic operation. At the conclusion of the analysis, the buffer solutions and samples are transmitted from the cell and new buffer solutions and samples are introduced into the cell for analysis. For this purpose, two pumps indicated at 18 and 20 are preferably employed, the flow of the liquids being from right to left as viewed in FIG. 1. The sample supply tube is indicated at 22 and the inlet tubes for supplying the buffer solution to chamber 16 are indicated by the reference numerals 24 to 32 and 36 and 38. The pump tube for the sample is indicated at 34.

Figure 1:
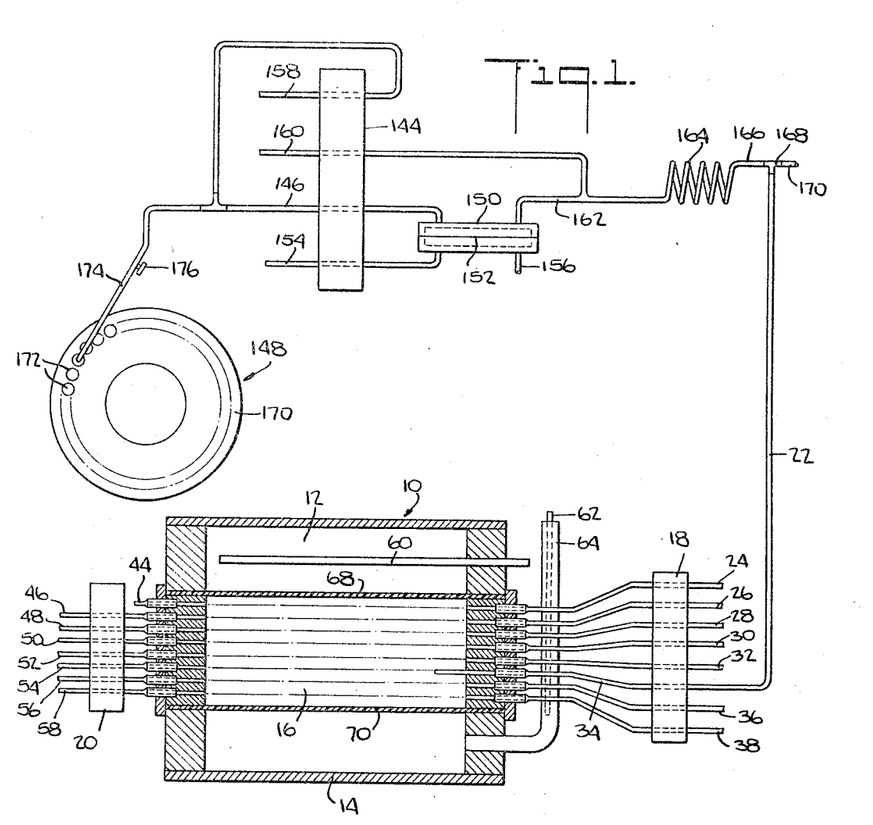
FIG. 1 is a schematic view of the apparatus and system of the invention, including a vertical sectional view of the electrophoresis cell.

The chamber 16 is provided with an outlet opening 44 which is exposed to the atmosphere so that excessive pressures or vacuums do not occur in the chamber due to unequal pumping rates between pump 18 and pump 20. A waste liquid receptacle may be provided for receiving the liquid which flows from opening 44 during the operation of the pumps but it will be understood that during the scanning operation when the pumps are not operating, no liquid flows from outlet opening 44 because there is no pressure in the chamber to cause flow of the liquid. The outlet tubes are indicated by the reference numerals 46 to 58, respectively, and it will be understood that pump 20 is operable to aid pump 18 in effecting the flow of the sample and the buffer solutions into and out of chamber 16 of the cell.

The liquids in chamber 16 are subjected to an electric potential which is provided by a carbon electrode 60 positioned in electrolyte chamber 12 and by a carbon electrode 62 which is in communication with the electrolyte in chamber 14. Electrode 62 is positioned in a tube 64 which is open at its upper end and is in communication with the electrolyte in chamber 14 at its lower end. Electrode 60 is positive, while electrode 62 is negative and the electrodes are connected to a source of D.C. voltage of suitable value, say 300 volts. Semi-permeable membranes 68 and 70 of cellophane or other suitable material are positioned across the opening between chambers 12 and 16 and across the opening between chambers 14 and 16, respectively, whereby the potential of the electrode is applied vertically across the liquid in chamber 16 to provide the potential gradient for the electrophoretic separation of the proteins in the sample introduced into chamber 16 through tube 34.

As best seen in FIGS. 4 to 7, the cell 10 is preferably formed of a suitable transparent plastic. The cell comprises an upper section 72 in which electrolyte chamber 12 is formed, an intermediate section 74 in which the liquid chamber 16 is formed, and a lower section 76 in which electrolyte chamber 14 is formed. The sections are held together by the upper and lower plates 78 and 80, respectively, by bolts (not shown) which pass through the sections and the plates. Membrane 68 is clamped between sections 72 and 74 and membrane 70 is clamped between sections 74 and 76. The inlet for the electrolyte solution of chamber 12 is indicated at 82 and an outlet for the solution is indicated at 84. The inlet for the electrolyte solution of chamber 14 is indicated at 86 and the outlet for the solution is indicated at 88.

Figure 9:
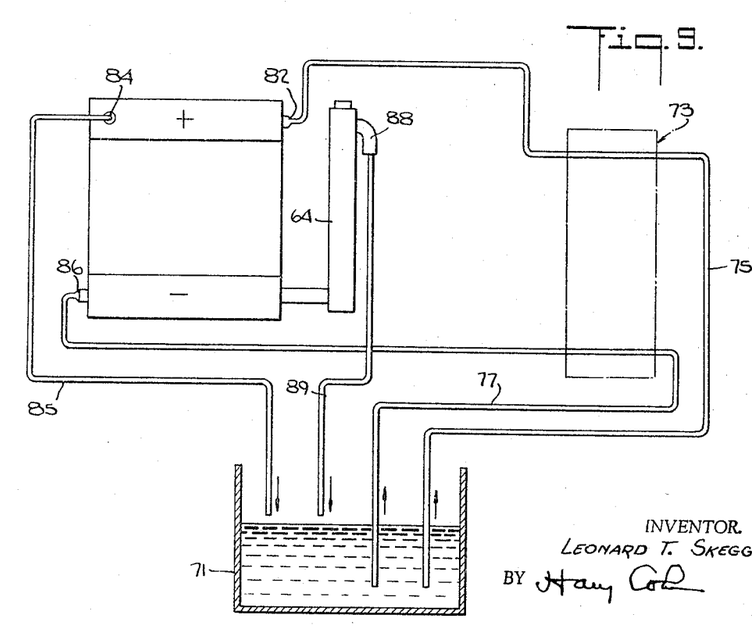
FIG. 9 is a more or less diagrammatic view of the cell and the provision for the supply of electrolyte thereto.

The electrolyte is preferably a buffer solution which, by way of example, is prepared from a stock buffer solution made by dissolving 425 grams of tris (hydroxymethyl) aminomethane 42.1 grams ethylenediamine tetracetic acid, and 32.4 grams of boric acid in a quantity of distilled water to make up 700 ml. of the solution. The buffer is made from the stock buffer by mixing 532 ml. of the stock buffer solution with 8150 ml. distilled water and 180 ml. of stock phenylmercuric acetate which acts as a preservative and is prepared by dissolving one gram in 1 liter of distilled water. The electrolyte is preferably pumped into and out of chambers 12 and 14 and to and from a supply reservoir 71 by a pump 73 through pump tubes 75 and 77, respectively, and return to the reservoir together with any gases which may be present in said chambers by way of tubes 85 and 89. As reservoir 71 is vented, the gases are liberated and only the electrolyte free of gases is supplied to the cell chambers 12 and 14. Voltage is applied to the electrodes from a regulated voltage supply as hereinafter described with reference to FIG. 10.

Intermediate section 74 is positioned between two end members 90 and 92 which contain vertically extending channels 94 for the passage of cooling fluid therethrough to cool the cell during the electrophoretic action. Each end member is provided at its lower portions with an inlet 96 and an outlet 98 for the cooling fluid and the channels are in fluid communication with each other by passage 100 at the upper portion of the end member. Positioned intermediate the channels 94 of each end member is a series of vertically spaced passages 102 for transmitting the liquids from the inlet tubes 24 to 38, respectively, to chamber 16 and for transmitting the liquids from said chamber to the outlet tubes 44 to 58, respectively, as the case may be. Gaskets 104 are provided to prevent any leakage of liquid from chamber 16. The side walls 105 of the chamber are preferably formed of quartz and are transparent to permit the passage of light therethrough for examining the liquid in the chamber. End plates 106 are clamped by bolts (not shown) and the plates are provided with vertically spaced holes 108 to accommodate the nipple ends 109 of the inlet and outlet tubes. It will be understood that, with the exception of the electrodes, all parts of the cell which are in contact with the liquid are electrically non-conductive.

The different densities of the several buffer solutions which are transmitted into and out of chamber 16 are derived by adding sucrose or other uncharged molecules, for example, glycerine, to the above described buffer to increase its density. The buffer solution which is supplied through tube 38 at the bottom of chamber 16 has the highest density, the buffer solutions supplied through the other tubes being of lower densities. The buffer solution of lowest density are supplied through tubes 24, 28 and 32. The following table is a preferred example but non-limitative example of the buffer solutions supplied to chamber 16 through the designated tubes:

| Tube | Sucrose, Percent | Buffered Sucrose, ml | Buffer, ml. |
|---|---|---|---|
| 24 | 0 | 0 | 3,000 |
| 26 | 42.5 | 1,075 | 126 |
| 28 | 0 | 0 | 3,000 |
| 30 | 25.0 | 639 | 570 |
| 32 | 0 | 0 | 3,000 |
| 36 | 45 | 1,140 | 63 |
| 38 | 47.5 | 1,360 | 0 |

The sucrose solution for providing the buffers of different densities is a stock 50% sucrose solution prepared by dissolving 2200 grams of sucrose (highest purity) in distilled water in a quantity to make a final volume of 4400 ml. The resulting solution is treated with decolorizing carbon and then filtered. Phenylmercuric acetate is added as a preservative. For this purpose 176 mg. of the phenylmercuric acetate is dissolved in a few milliliters of boiling water and this solution is stirred into the sucrose solution. The sucrose solution as thus prepared is substantially non-absorptive of ultra-violet light measured at 280 mu which is the wave length of the scanning light.

The buffered sucrose solution of the above table is prepared by mixing 168 ml. of the above described stock buffer solution with 33 ml. distilled water and 4000 ml. of the above described stock 50% sucrose solution. It will be understood that the buffers supplied to cell 10 through the tubes specified in the above table are prepared by mixing the buffers and the buffered sucrose in the indicated quantities.

The sample liquid which is supplied to the cell through tube 22 is diluted with a 64% sucrose solution which is prepared by dissolving 320 grams of sucrose in a quantity of distilled water to make up 500 ml. of the solution. It is decolorized by treatment with carbon and is preserved by adding a solution of 20 mg. of phenylmercuric acetate in a few milliliters of water. Two parts of this sucrose solution added to one part of the sample liquid, by volume provides the sample with 42.7% sucrose so that the density of the liquid sample in the cell is less than the density of the buffers introduced into the cell below the sample through tubes 36 and 38.

Figure 8:
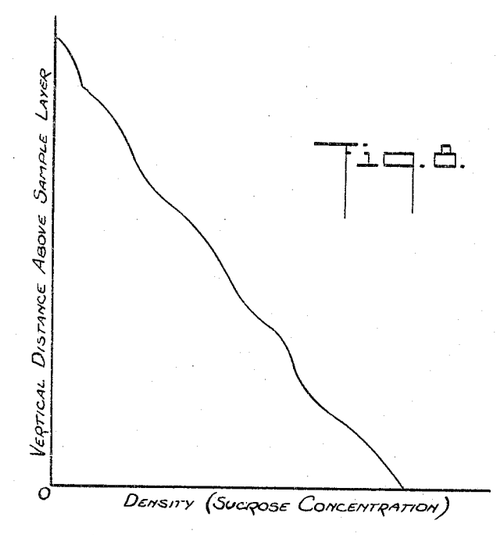
FIG. 8 is a view illustrative of the continuous or substantially straight-line density gradient of the buffer above the sample layer in the cell.

The buffers which are introduced into the cell above the liquid samples provide a substantially straight line density gradient above the sample as illustrated diagrammatically by FIG. 8. This graph represents change in sucrose concentration in the density gradient formed above the sample layer. Although the line of the graph is not perfectly straight, it is sufficiently straight to give good results, i.e., good stabilization of the separated protein zones as a result of the application of the electric potential to the sample liquid in the cell. It will be noted by reference to the above table of sugar concentration in the buffer supplied through tubes 24 to 32 which are above the tube through which the sample is supplied that a buffer of higher sucrose concentration is introduced through tube 26 than through tube 28 and, similarly, a buffer of higher sucrose concentration is introduced through tube 30 than through tube 32. This results in the automatic and quick mixing of the buffers in the cell, by gravity, above the sample so that the density of the buffer above the cell decreases with the vertical distance above the sample, in almost direct proportion, to provide the continuously varying density gradient which results in the aforementioned stabilization of the separate protein zones.

The vertically applied electric potential across the vertically stratified layers of buffer solutions and sample liquids results in the fractionation of the proteins of the sample and this is done preferably when there is no flow of the liquids through chamber 16. This may be readily accomplished by stopping the operation of pumps 18 and 20, which are of the compressible tube type, and the pressure rollers of these pumps collapse the inlet and outlet tubes, thereby preventing flow of liquids therethrough. During this interruption of operation of pumps 18 and 20, pump 144 continues to operate for a sufficient length of time to transmit some of the next sample and the diluent to the fitting 168, and then stops. The operation of pump 144 is resumed when pumps 18 and 20 are again operated for supplying the next diluted sample and the reagents to the cell. During the application of the electric potential, the various constituent proteins in the sample travel or migrate upwardly from the sample layer under the influence of the electric potential at a rate dependent on their respective charges and form horizontal bands at various different levels in chamber 16, corresponding respectively to the albumin, alpha globulin, beta globulin, and gamma globulin constituents of the plasma sample. It is to be noted that chamber 16 is devoid of any obstructions to the movement of the various constituent proteins.

Figure 2:
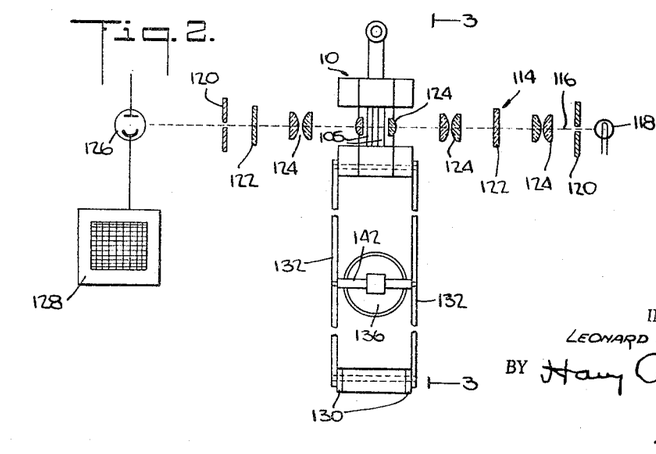
FIG. 2 is a top plan view illustrating the arrangement of the parts of the apparatus with certain parts being illustrated schematically.

The apparatus of the invention includes means for providing a visual quantitative indication of the protein components of the sample fractionated in the electrophoresis chamber 16. As shown in FIG. 2, a light viewing means 114 is positioned so that ultra-violet light 116 from a monochromator 118 passes through the side walls or quartz windows 105 of chamber 16 for examining the liquid therein. The light viewing means also includes light slits 120, filters 122 to transmit ultra-violet light of 280 mu, preferably, from the light source 118, lenses 124, and a photoelectric tube 126 which is responsive to the light transmitted through the liquid and which controls the operation of a recorder 128 for recording quantitatively the constituents of the sample stream. The recorder may be a conventional one of the well known slide wire, self-balancing bridge type.

Figure 3:
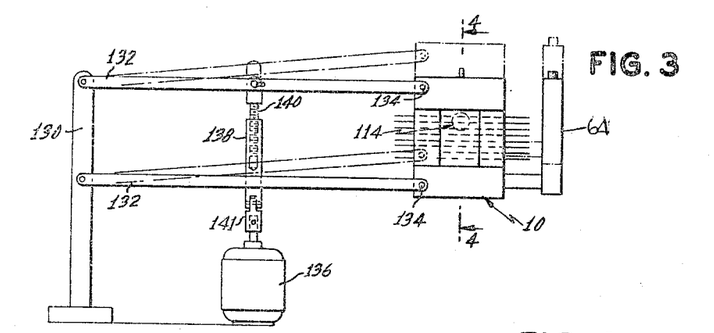
FIG. 3 is an elevational view, on a larger scale, taken on line 3—3 of FIG. 2.
Figure 4:
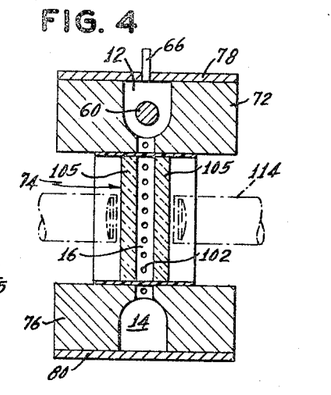
FIG. 4 is a vertical sectional view, on a larger scale, taken on line 4—4 of FIG. 3.
Figure 5:
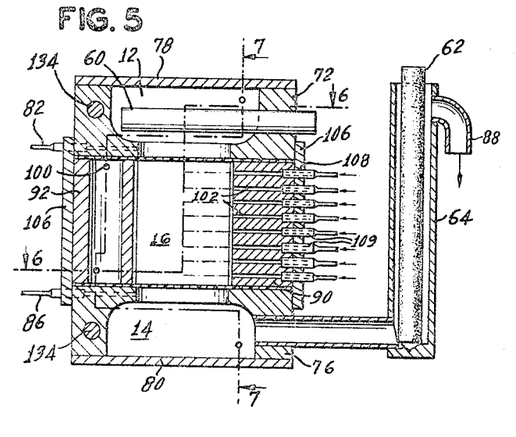
FIG. 5 is a vertical sectional view taken on line 5—5 of FIG. 6.
Figure 6:
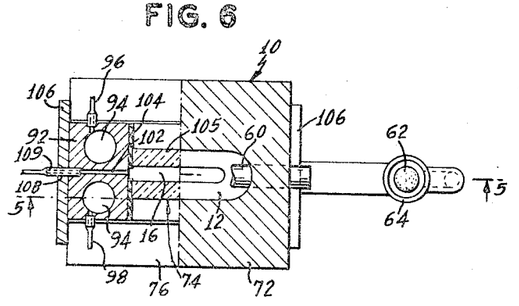
FIG. 6 is a horizontal sectional view taken on line 6—6 of FIG. 5.
Figure 7:
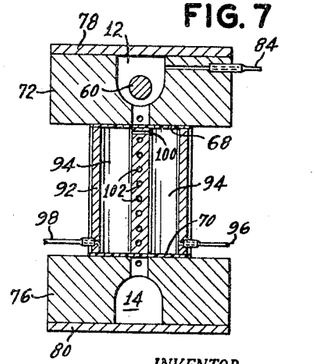
FIG. 7 is a vertical sectional view taken on line 7—7 of FIG. 5.

The electrophoresis cell 10 is mounted for vertical movement, which is substantially rectilinear, so that light beam 116 of the light viewing means is able to scan the various vertically spaced layers of the liquid in chamber 16 during electrophoretic action and the results of this scanning operation is continuously recorded during scanning. The means for moving the electrophoresis cell up and down past the light beam comprises the stationary horizontally spaced posts 130 which pivotally support horizontally spaced pairs of vertically spaced rigid link member 132 at one end of each link member. The other ends of the link members are each pivotally connected to the electrophoresis cell at the pins 134 which extend from the sides of the cell. A reversible motor 136 drives an internally threaded sleeve 138 into which is screwed an externally threaded pin 140. The upper end of the pin is rigidly connected to a cross bar 142 which is connected to the upper links 132 and prevents pin 140 from rotating during the rotation of sleeve 138 causing said pin to move into and out of the sleeve resulting in the vertical movement of the electrophoresis cell past the light beam for the scanning operation. The shaft of the motor is connected to sleeve 138 through reduction gearing (not shown) by means of a universal joint coupling member 141. The inlet and outlet tubes connected to the electrophoresis cell are flexible to permit the vertical movement of the cell. It will be noted that although the links or bars 132 are pivotally movable on the support 130, they are sufficiently long so that the arcuate movement of cell 10 is so slight as to be negligible in the vertical path of movement of said cell. As described, the relative motion between the cell and the scanning means is provided by moving the cell vertically in a substantially rectilinear path while the scanning light and lenses are stationary, but it will be understood that it is within the scope of the invention to move the scanning light vertically while the cell is stationary.

At the completion of one scanning operation, the pumps 18 and 20 are again operated to remove the previously examined liquids in the liquid chamber 16 and to introduce into the chamber another series of buffer solutions and sample for analysis.

As indicated above, individual samples may be supplied in succession for electrophoresis fractionation in cell 10. If necessary, each of said samples may be dialyzed to free them from salts, if present in excessive amounts; otherwise dialysis is not necessary. The sample supply device for this purpose is indicated at 148. As illustrated in FIG. 1, the samples are transmitted through a dialyzer 150, but this is not necessary when the buffer solutions have an ionic strength which is appreciably greater than that of the sample. However, although the dialyzer is usually unnecessary, its use is advantageous when the samples have a high ionic strength. As here shown, when a dialyzer is used the samples are transmitted by a pump 144 through tube 146 from an intermittently rotated supply device 148 through dialyzer 150 at one side of the membrane 152 thereof concurrently with the pumping of distilled water by said pumpy through the dialyzer at the other side of its membrane by way of tube 154 and outlet tube 156. Also each sample is formed into a series of spaced segments separated from each other by intervening segments of air by introducing air into tube 146 by way of tube 158 into tube 146. After each sample is dialyzed and thus freed of salts, the previously mentioned 64% sucrose solution is added to the sample by way of tube 160 and joins the dialyzed sample stream in tube 162 and the dialyzed sample containing the added sucrose solution flows to the helical mixing coil 164.

The outlet of the mixing coil is connected to tube 166 which has T-fitting 168 to which sample supply 22 is connected. As the segmented stream flows through tube 166 only the liquid segments flow into tube 22 and the air and a small quantity of the liquid flow to waste through the extension 170 of tube 166 beyond said T-fitting. Thus the sample liquid with the added sucrose solution is freed from the air segments initially added to the sample tube to aid preventing contamination of one sample by a preceding sample, as explained in my U.S. Patents Nos. 2,797,149 and 2,879,141. The outlet end of tube 22 is connected to the tube 34 of the pump, said pump tube having a diameter which is such that the flow rate of the sample mixed with sucrose into the cell is 0.20 ml. per minute, i.e. it is sufficiently low to result in a thin layer of the sample being formed in the cell above the denser liquid supplied to the cell through tube 36 and the less dense liquid in chamber 16 about the sample layer. Preferably, as shown in FIG. 1, supply tube 34 extends a short distance into the cell chamber 16 to aid in the formation of the thin sample layer between the buffer above and below said layer.

The supply device 148 comprises a rotary plate 170 provided with a plurality of circumferentially spaced sample cups indicated at 172. Plate 170 is rotated intermittently about its vertical axis by a Geneva gear mechanism (not shown), and a pick-up tube indicated at 174 is connected to tube 146 and is pivoted at 176 for pivotal movement into and out of cups 172 while the rotary plate is stationary. When the pick-up tube is retracted from the cups, pumps 18, 20 and 144 are stopped so that no air is introduced into pick-up tube between samples. Thus the stream of fluid which flows through mixing coil consists of air-spaced segments of sample liquid mixed with the sucross solution described above. Said supply device 148 is preferably of the construction described in U.S. Patent No. 3,038,340 issued June 12, 1962. The dialyzer 150, if used, is preferably of the construction shown in the U.S. Reissue Patent No. 24,736, wherein there is a spiral groove at each side of the membrane 152 and the grooves are in registered confronting relation so that each provides a tubular passage at the sides of the membrane.

The pumps are each preferably of the construction described in U.S. Patent No. 2,893,324. In such pump resilient tubes are compressed progressively along their lengths by rollers which are moved in engagement with the tube longitudinally thereof, and the quantity of fluid pumped through each tube depends upon the internal diameter of the tube. In the case of pumps 18 and 20, all of the tubes for the buffer solutions are of the same diameter, while in the case of pump 144, the tubes have different internal diameters for the flow of the fluids therethrough in predetermined proportions. It will be understood that the pumping action of the pump is accomplished by compressing the tubes by the pressure rollers and moving said rollers along the tubes which pushes the fluids through the tubes. When the pumps are stopped and the pressure rollers are no longer moving longitudinally along the tubes, the tubes will be collapsed or compressed at the position where they are engaged by the pressure rollers and in this manner the pumps function as valves to close off the flow of liquids to and from the electrophoresis cell 10. It will be understood that during the scanning operation when there is no flow of liquids through the electrophoresis cell, the immobility of the liquids prevents intermixing of the various rows of buffer solutions. The membranes 68 and 70 help prevent the mixing of the electrolyte solutions with the liquids in chamber 16.

The pick-up tube 174 is inserted in a sample cup 172 and all pumps are operated to transmit a portion of the sample to the cell 10. After the sample is introduced into the cell, all the pumps are stopped and the supply device 148 is operated to index the rotary plate 170 so that the next sample cup is in position below the withdrawn pick-up tube which is then inserted into the cup in position for aspirating a portion of the next sample, and the operation of the supply device is stopped. After the sample has been introduced into the cell, a short period is allowed during which equilibrium occurs between the various liquids in the cell. The recorders 128 is operated to obtain a base line and the electric potential is then applied across the cell for the electrophoresis operation and the results of the examination of the liquids in the cell by the scanning operation are recorded on the recorder. At the conclusion of the electrophoresis operation, the pumps are again operated to aspirate a portion of the next sample and introduce it into the cell as the preceding sample and liquids are pumped from the cell. The recorder is shut off at the end of the recording operation and is operated for the next sample as just described.

In the preferred method of operating the continuous electrophoresis apparatus of this invention for the analysis of each of the series of samples, three scanning operations are performed, designated for convenience and brevity of expression as Scan 1, Scan 2, and Scan 3. Scan 1 is taken to confirm the presence of the sample in the cell and the quality of the sample zone before the application of the voltages for the electrophoretic action, and also to check the base line on the chart paper of the recorder. Scan 2 is taken at a predetermined time after the completion of Scan 1 and is performed for a predetermined length of time during which the voltage is applied for the electrophoretic fractionation of the sample. Scan 3 is taken at a predetermined time after the completion of Scan 2 and is performed for the purpose of obtaining a record of one or more fractions which might not have been fully fractionated or recorded during Scan 2. After Scan 3, which is performed for a predetermined period of time, the cycle is completed during a predetermined period of time to wash out the sample from the cell with part of the next sample liquid from tube 34 along with other liquids from the cell by the above mentioned solutions supplied through tubes 24 through 32, 36 and 38 and to re-load the cell with the next sample and the buffers.

The complete operation of the apparatus including the operation of the pumps, the actuation of the sample supply device, and the scanning operations, is performed automatically and under the control of programming apparatus which will now be described with special reference to FIG. 10, which is a schematic view of the apparatus and the controlled parts of the electrophoresis apparatus of the invention.

The programming apparatus comprises a timer including an electric clock motor 200 provided with suitable reduction gearing so that the cam shaft 202 is driven at the desired slow speed at, say, one revolution in twenty minutes. The cams on shaft 202, and rotated thereby, are designated A to J, respectively. These cams are switch-operating cams for the switches A1 to J1 associated with said cams. Alternating current, 60 cycles, at the usual 110 to 115 volts is supplied at the line terminals L1 and L2. Cam controlled switches D1, E1 and F1 are closed by their companion cams to start cell-drive motor 136 for the three scanning operations, respectively. When switch D1 is closed which occurs when the switch actuator moves into the cam recess D2, a circuit is completed through said switch for energizing the cell-drive motor 136 to move the cell downwardly for the scanning operation. Thereafter, motor 136 is reversed, as hereinafter described, and cell 10 is moved upwardly by said motor to position the cell for downward movement for the next scanning operation. The sequence of operation of the parts required for a scanning cycle briefly described is as follows. When cell 10 moves upwardly a projection 206 carried thereby engages the actuator of the normally closed microswitch 204 and opens the circuit from line L1 to the motor windings. When any one of the microswitches D1, E1 or F1 closes the circuit under the control of the companion cams D, E and F, respectively, microswitch 204 is bypassed and a circuit is completed to the motor for actuating the latter. However, cell 10 continues to move upwardly for a short distance until the actuator of normally open microswitch 208a is actuated by projection 208a' carried by cell 10 to close said switch whereupon reversing relay 208c is energized and relay contacts 208j are thereupon closed, the circuit being completed through the winding of said relay from line L2 to line L1 through the normally closed microswitch 208b. When the projection 208a' releases the actuator of switch 208a when the cell starts to move downwardly and said switch opens, the winding of relay 208c remains energized through the holding circuit from line L2 through the closed relay contacts 208j through normally closed microswitch 208b to line L1. Said relay is de-energized when projection 208b' strikes the actuator of switch 208b for opening said switch and by de-energization of the relay.

Figure 10:
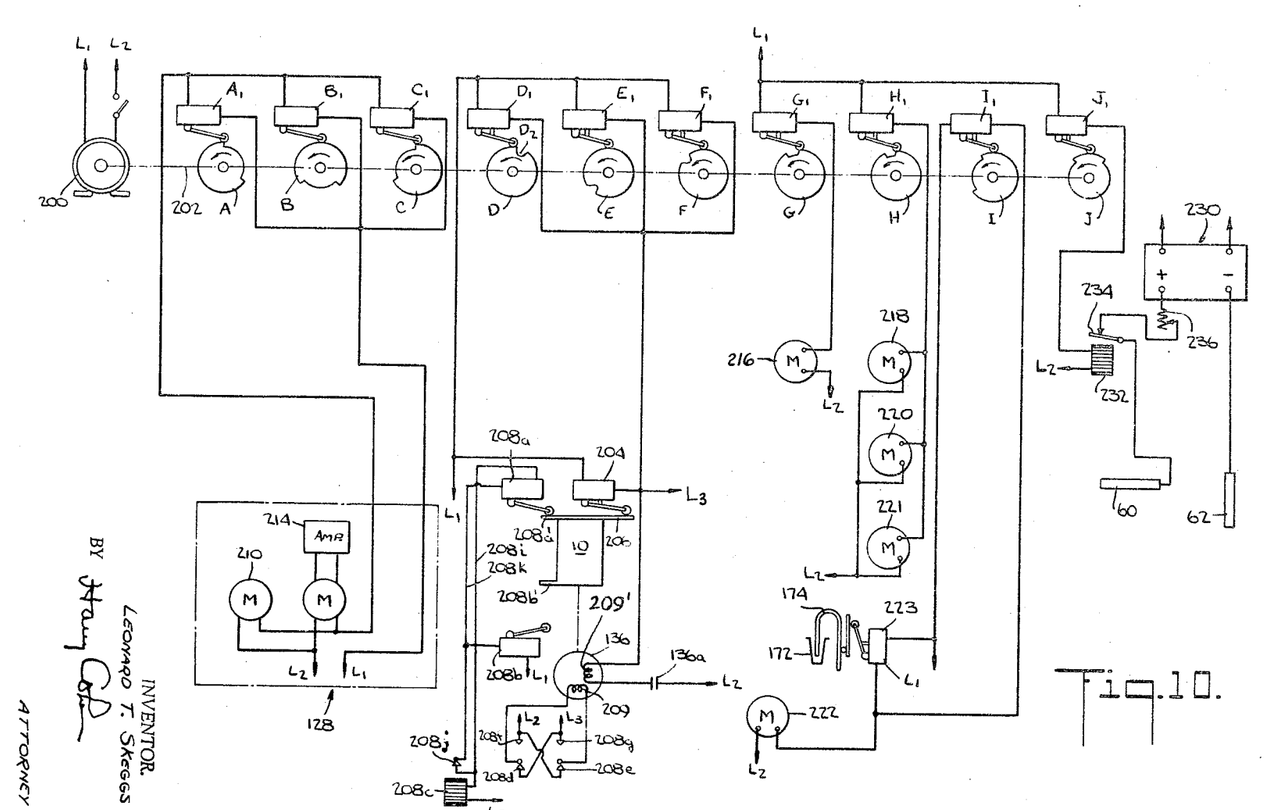
FIG. 10 is a diagrammatic illustration of the programming apparatus in relation to various controlled parts of the complete apparatus.

As illustrated by FIG. 10, motor 136 which moves the electrophoresis cell 10 vertically up and down for the scanning operation is an alternating current synchronous capacitance motor of a well known type, the capacitance of which is diagrammatically shown at 136a. The motor has two stator windings indicated at 209 and 209'. As here shown, provision is made for reversing the direction of the motor by reversing the direction of the current flow in said winding 208 by operation of the reversing relay 208 under the control of microswitches 208a and 208b actuated by projections 208a' and 208b', respectively, on cell 10. Upper switch 208a is normally open and is closed momentarily by the upward movement of cell 10 when programmer switches D1 or E1 or F1 is closed, as previously described. Lower switch 208b is normally closed so that at the bottom of cell travel, when switch 208b is opened by the projection 208b', the relay winding 208c is de-energized so that the movable relay contacts disengage the stationary contacts 208d and 208e and engage the stationary contacts 208f and 208g. However, as illustrated by FIG. 10, the relay circuit is shown in the condition immediately following the start of the downward movement of cell 10 for the scanning operation.

As here shown, switch 204, which is a normally closed switch, is shown in its closed condition, since the cell has begun its descent. However, when the cell had completed its upward movement in the scanning operation and switch D1, E1 or F1 was closed by the companion programmer cam, a circuit was completed momentarily through motor 136 so that cell 110 continued to move upwardly a short distance even though switch 204 was opened. This short further upward movement of cell 10 results in the closing of switch 208a thereby completely a circuit from line L1 through normally closed switch 208b to line 208k then through switch 208a to the line 208i and through relay winding 208c to line L2, thus completing the circuit of the relay winding in the condition shown by FIG. 10 and the motor is actuated in a direction for moving the cell downwardly. When the cell moves a short distance downwardly, switch 208a opens but the winding 208c remains energized at the contacts 208j in the holding or stick circuit which includes the line 208k which bypasses switch 208a. It will be understood that the motor remains energized through switch D1, E1, or F1 as the case may be until projection 206 releases the actuator of the normally closed switch 204 so that the latter closes and the motor continues to operate even though the cam operated switch is subsequently opened a short time after switch 204 is closed. When cell 10 reaches the lower end of its travel, switch 208b is opened thereby opening the holding circuit of the relay at the contacts 208j so that the movable current-reversing contacts of the relay disengage the stationary contacts 208d and 208e and engage the stationary contacts 208f and 208g for reversing the direction of flow of current in the field winding 208 of motor 136 and thereby reversing the direction of rotation of said motor for moving the cell 10 upwardly. It will be noted that the circuit to motor 136 at one of the power supply lines is completed through a terminal L3 which is connected to the power line L1 through switch 204 so that when said switch is opened at the time the cell 10 returns to its upper position, power is removed from the motor 136 and said motor is not energized until the next cam operated switch for the circuit of motor 136 is closed.

The recorder 128 is operated, of course, during each scan under the control of timer cams A, B and C and their companion switches. The recorder motor 210 which drives the chart paper feed is thus operated only during the scan period and the recorder stylus is operated by the balancing motor of the self-balancing null-type bridge circuit which includes the signal amplifier 214 responsive to signals from photo-electric cell 126 (FIG. 2) in the scanning operation. A self-balancing circuit of this type which also includes provision for linearizing the recording on the chart paper is shown and described in U.S. Patent No. 3,031,917, issued May 1, 1962.

In FIG. 10, the motor 216 for driving pump 144 which pumps the sample and sucrose in predetermined proportions, as previously described, is operated under the control of cam G and the companion switch G1. Cam H and its companion switch H1 control the operation of motors 218 and 220 which drive pumps 18 and 20 (FIG. 1), respectively, and a motor 221 which drives the electrolyte pump 73 (FIG. 9).

The motor 222 which drives the turn table or rotary plate 170 of the sample supply device (FIG. 1) is energized under the control of cam I and its companion switch I1 which starts the motor by bypassing microswitch 223 which is then open. The take-off tube 174 is then projected into a sample supply cup 172 where it remains for a predetermined period of time, and then starts to move out of the cup and when out of the cup it releases microswitch 223 so that it closes. The microswitch I1 opens shortly thereafter and motor 222 continues to operate to move the next cup to the take-off position. When tube 174 is withdrawn from the cup cam switch I1 opens but motor 222 continues to operate until microswitch 223 is opened by the movement of tube 172 into said next cup. Take-off tube 174 remains in the sample cup for a predetermined period of time but the flow of sample is determined by the period of pump operation under the control of cam switch H1.

Cam J and its companion switch J1 control the application of the electrophoresis voltage from the regulated voltage supply 230 through a relay 232 which is energized at comparatively low voltage (usually 110 volts) thereby obviating the need to apply the comparatively high voltage, say 300 volts or higher, to switch J1, in a separate circuit instead of in the current supply for the other switches of the timer. As here shown, electrode 60 of the cell is connected through the relay contact 234 through the adjustable resistance 236 to the positive side of the voltage supply and electrode 62 is connected to the negative terminal of the regulated voltage supply, and by way of a non-limitative example.

Summarizing briefly the flow pattern of the liquids into and out of the cell chamber 16, the mixture of sample liquid and 42.7% sucrose is pumped into the flow cell through tube 34 at the slow flow rate of 0.2 ml. per minute and floats on top of the 45% sucrose of the buffer which enters the cell through tube 36. The relatively rapid flow of the solutions in chamber 16 below and above the sample result in "squeezing" and attenuating the sample into a very thin sharp band horizontally across chamber 16. As the solutions admitted through tube 26 (42.5% sucrose) and tube 30 (25% sucrose) enter the cell they fall through the lighter solutions (which do not contain sucrose) below them resulting in turbulence, partial mixing and formation of the density gradient above the sample. As previously stated, the sample line is extended a short distance into chamber 16 beyond the points of inlet of the other solutions so that the sample layer is undisturbed by this mixing process.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of electrophoresis according to which buffer liquid and a sample liquid are introduced into a chamber of an electrophoresis cell across which a voltage is applied for the electrophoretic treatment of the sample liquid in said chamber for electrophoretically separating ingredients thereof, said method comprising providing a plurality of buffer liquids of different densities, respectively, treating the sample liquid to impart thereto a selected density, introducing a horizontally flowing stream of said treated sample liquid into said chamber at a predetermined level, simultaneously introducing into said chamber individual horizontally flowing streams of said buffer liquids at different levels, respectively, below and above the level of said sample in said chamber, the density of the treated sample liquid being not greater than the density of the buffer below the sample liquid and greater than the density above the sample liquid, for forming in said chamber, by the flow of said sample and buffer liquids, a horizontal layer of sample liquid and a density gradient above said sample liquid, the density of at least one of the buffer liquids introduced into the chamber above the level of the sample liquid being greater than a buffer liquid introduced into the chamber adjacent to and below said one of the buffer liquids so as to mix therewith by gravity during the flow of the liquids into said chamber, applying said voltage for the electrophoretic treatment of said layer of the sample liquid, scanning the liquid in said chamber in the region of at least part of said density gradient for examining the voltage-induced migration of ions from the sample liquid into the density gradient, and operating a recorder in response to the scanning operation for providing a record of the quantities of the electrophoretically separated ingredients, respectively, of the sample liquid.

2. A method of electrophoresis according to which buffer liquid and a sample liquid are introduced into a chamber of an electrophoresis cell across which a voltage is applied for the electrophoretic treatment of the sample liquid in said chamber, said method comprising providing a plurality of buffer liquids of different densities, respectively, treating the sample liquid to impart thereto a selected density, introducing a horizontally flowing stream of said treated sample liquid into said chamber at a predetermined level, simultaneously introducing into said chamber individual horizontally flowing streams of said buffer liquids at a different levels, respectively, below and above the level of said sample in said chamber, the density of the treated sample liquid being not greater than the density of the buffer below the sample liquid and greater than the density above the sample liquid, for forming in said chamber, by the flow of said sample and buffer liquids, a horizontal layer of sample liquid and a density gradient above said sample liquid, the density of at least one of the buffer liquids introduced into the chamber above the level of the sample liquid being greater than a buffer liquid introduced into the chamber adjacent to and below said one of the buffer liquids so as to mix therewith by gravity during the flow of the liquids into said chamber, thereafter interrupting the flow of said liquids into and out of said chamber for a predetermined period of time, applying a voltage across the liquid in said chamber during at least part of said period of time for the electrophoretic treatment of said layer of sample liquid, thereafter scanning the liquid in said chamber in the region of said density gradient by projecting a beam of light through the liquid in said region and relatively moving the beam of light and the cell in a vertical direction, and operating a recorder under the control of electrical means responsive to the scanning light at the light-exit side of said cell.

3. A method of electrophoresis according to which buffer liquid and a sample liquid are introduced into a chamber of an electrophoresis cell across which a voltage is applied for the electrophoretic treatment of the sample liquid in said chamber, said method comprising providing a plurality of buffer liquids of different densities, respectively, treating the sample liquid to impart thereto a selected density, introducing a horizontally flowing stream of said treated sample liquid into said chamber at a predetermined level, simultaneously introducing into said chamber individual horizontally flowing streams of said buffer liquids at different levels, respectively, below and above the level of said sample in said chamber, the density of the treated sample liquid being not greater than the density of the buffer below the sample liquid and greater than the density above the sample liquid, for forming in said chamber, by the flow of said sample and buffer liquids, a horizontal layer of sample liquid and a density gradient above said sample liquid, applying said voltage for the electrophoretic treatment of said layer of the sample liquid, thereafter scanning the liquid in said chamber in the region of said density gradient by projecting a beam of light through the liquid in said region and relatively moving the beam of light and the cell in a vertical direction, and operating a recorder under the control of electrical means responsive to the scanning light at the light-exit side of said cell.

4. A method of electrophoresis according to which buffer liquids and a sample liquid are introduced into and discharged from a chamber of an electrophoresis cell across which an electric potential is applied for the electrophoretic treatment of the sample liquid in said chamber, said method comprising:

providing a plurality of buffer liquids of different densities, respectively;

treating the sample liquid to impart thereto a selected density;

introducing a horizontally flowing stream of the treated sample liquid into the chamber at a predetermined level, and concurrently introducing individual horizontally flowing streams of the buffer liquids into the chamber at different levels, respectively, below and above the level of the stream of sample liquid, the density of buffer liquid introduced below the stream of sample liquid being not less than the density of the sample liquid, the density of the buffer liquid introduced immediately above the sample liquid being less than the density of the sample liquid, and at least one of the streams of buffer liquids introduced above the sample liquid having a density greater than the sample liquid, thereby providing a relatively linear density gradient in relation to the sample liquid by gravity induced turbulence and partial mixing of the buffer liquids.

5. A method according to claim 4 further including:

after the gravity induced turbulence and partial mixing of the buffer liquids has provided the relatively linear density gradient;

interrupting the flow of the sample and buffer liquids into and out of the chamber for a predetermined period of time; and applying the electric potential across the liquid in the chamber during at least part of said period of time for the electrophoretic treatment of the sample liquid.

6. A method according to claim 5 further including:

after applying said electric potential and during said period of time;

scanning the liquid in the chamber in the region of the density gradient by projecting a beam of light through the liquid in said region, vertically moving the beam of light and the cell in a vertical direction, and measuring the beam after it leaves the liquid.

7. Electrophoresis apparatus, comprising:

an electrophoresis chamber having a light-permeable portion and liquid inlet means and liquid outlet means;

means for transmitting a flow of liquid into and out of said chamber through said inlet means and said outlet means, respectively;

means for applying an electric potential across the liquid in said chamber to separate the components of a substance in the liquid by electrophoratic action, light viewing means operable in relation to said chamber for directing a light beam at said light-permeable portion of said chamber for examining said liquid to provide a quantitative indication of the components of the substance in said liquids including means for providing relative movement between said light-permeable portion of said chamber and said light beam to permit said viewing means to scan said liquid; and means for interrupting the flow of the liquid into and out of said chamber during the scanning operation of said light viewing means.

8. Electrophoresis apparatus according to claim 7 wherein said flow interruption means includes control means coupled to said flow transmitting means and said light viewing means for halting said transmitting means and for actuating said light viewing means.

9. Electrophoresis apparatus according to claim 8 further including:

recorder means operable under the control of said viewing means for providing a recording of the quantities of said components.

10. Electrophoresis apparatus according to claim 8 wherein said control means is coupled to said electric potential means after said transmitting means has been halted.

11. Electrophoresis apparatus according to claim 7 wherein said relative movement means include means for moving said light-permeable portion of said chamber transversely of said light beam.

12. Electrophoresis apparatus according to claim 7 wherein said inlet means and said outlet means are horizontally spaced for the flow of liquid horizontally into and out of said chamber;
said inlet means comprising a plurality of inlet openings disposed laterally of each other at different levels; and
means for introducing a plurality of liquids of different densities, respectively, through said inlet openings in the form of individual streams, respectively;
one of said streams comprising the liquid containing the substance to be subjected to said electrophoretic action.

13. Electrophoresis apparatus according to claim 12 wherein said potential applying means comprises electrolyte chambers at opposite sides, respectively, of said electrophoresis chamber, and electrodes of opposite polarity operatively connected with said electrolyte chambers, respectively, in conductive relation with the electrolytic in said electrolyte chambers, respectively, and
semi-permeable membranes separating said electrolyte chambers, respectively, from said electrophoresis chamber.

14. Electrophoresis apparatus according to claim 7 wherein said liquid transmitting means includes a sample supply device and a pump associated therewith for introducing a series of sample liquids intermittently one after the other into said chamber for electrophoresis analysis respectively.

15. Electrophoresis apparatus, comprising:
an electrophoresis cell having a liquid chamber provided with horizontally spaced liquid inlet means and liquid outlet means;
said liquid inlet means comprising a plurality of inlet openings disposed laterally of each other at different levels, respectively;
said liquid outlet means comprising a plurality of outlet openings disposed laterally of each other at different levels respectively; one of said inlet openings and one of said outlet openings being disposed at a common level intermediate the levels of others of said inlet openings and providing means for the flow into and out of said chamber of the sample liquid to be subjected to electrophoretic separation in said chamber; and
the others of said openings providing for the flow into and out of said chamber of buffer liquids below and above the sample liquid and to provide a density gradient for the electrophoretic migration of ions from the sample liquid in the chamber to different levels;
means for applying an electric potential access to the liquid in said chamber for inducing said electrophoretic migration of the ions;
said chamber being light-permeable in at least the region of electrophoretic separation of at least some of the ions of the sample liquid;
means including a source of light for scanning said region of the chamber, and providing a signal responsive to the concentration of the ions; and
means coupled to said scanning means for recording a signal responsive to said scanning signal.

16. Electrophoresis apparatus according to claim 15 further including:
means for effecting an intermittent flow of all of said liquids simultaneously into and out of said chamber through said openings, respectively, and
said potential applying means subjecting the sample liquid to electrophoretic separation during at least part of the interval of liquid flow interruption.

17. Electrophoretic apparatus according to claim 15 further including:
pump means for effecting an intermittent flow of all of said liquids simultaneously into and out of said chamber through said openings, respectively, and
programming means for automatically controlling the sequence of operations of said pumping means, the application of said voltage for said electrophoretic separation, and said scanning and recording operations.

18. Electrophoretic apparatus according to claim 15 further including:
means for automatically supplying a respective one of a series of individual samples to said chamber during a companionate flow of the buffer liquids into the chamber.

19. Electrophoresis apparatus according to the claim 17 wherein:
said potential applying means comprises electrolyte chambers at opposite sides, respectively, of said liquid chamber, and electrodes of opposite polarity operatively connected in said electrolyte chambers, respectively, in conductive relation with the electrolyte in said electrolyte chambers, respectively;
semi-permeable membranes separating said electrolyte chambers, respectively, from said liquid chamber; and
means operable automatically for periodically removing said electrolyte from said electrolyte chambers, following examinations of the sample liquids, and for introducing electrolyte into said electrolyte chambers between successive examinations of sample liquids, respectively, in said electrophoresis chamber.

20. Electrophoresis apparatus according to claim 19 further including:
a vented receptacle for the electrolyte for said electrolyte chambers;
said automatically operable means serving between successive examinations of the sample liquid in said electrophoresis chamber for discharging said electrolyte from said electrolyte chambers into said vented receptacle, for the removal of gases from said electrolyte chambers, and for thereafter reintroducing the electrolyte into said electrolyte chambers.

21. Electrophoresis apparatus, comprising a chamber having a light-permeable portion and horizontally spaced liquid inlet means and liquid outlet means for the flow of liquid into and out of the chamber, said inlet means comprising a plurality of inlet openings disposed laterally of each other at different levels, means for introducing a plurality of liquids of different densities through said inlet openings in the form of individual streams, respectively, one of said streams comprising a liquid containing a substance to be subjected to electrophoresis for determining the components of said substance, means for applying an electric potential vertically across the liquid in said chamber for separating said components by electrophoretic action, light viewing means operable in relation to said chamber for examining said liquid to provide a quantitative indication of the components of said substance, means for providing relative movement between said light-permeable portion and said viewing means to permit said viewing means to scan said liquid during the application of said electric potential, means for interrupting the flow of the liquid into and out of said chamber during the scanning operation, and recorder means operable under the control of said viewing means for providing a recording of the quantities of said components.

22. Electrophoresis apparatus, comprising an electrophoresis cell having a liquid chamber provided with horizontally spaced liquid inlet means and liquid outlet means, said liquid inlet means comprising a plurality of inlet openings disposed laterally of each other at different levels, respectively, said liquid outlet means comprising a plurality of outlet openings disposed laterally of each other at different levels, respectively, said inlet and outlet openings being arranged in pairs of openings at said different levels, respectively, one of said pair of openings being disposed at a level intermediate the levels of adjacent pairs of openings and providing means for the flow into and out of said chamber of the sample liquid to be subjected to electrophoretic separation in said chamber, and the other pairs of openings providing for the flow into and out of said chamber of buffer liquids below and above the sample liquid and to provide a density gradient for the electrophoretic migration of ions from the sample liquid in the chamber to different levels, means for applying a voltage to the liquid in said chamber for inducing said electrophoretic migration of the ions, said chamber being light permeable in at least the region of electrophoretic separation of at least some of the ions of the sample liquid, means including a source of light for scanning said region of the chamber, and means operable in response to the operation of said scanning means for recording the scan of said region.

23. Electrophoresis apparatus, comprising an electrophoresis cell having a liquid chamber provided with horizontally spaced liquid inlet means and liquid outlet means, said liquid inlet means comprising a plurality of inlet openings disposed laterally of each other at different levels, respectively, said liquid outlet means comprising a plurality of outlet openings disposed laterally of each other at different levels, respectively, said inlet and outlet openings being arranged in pairs of openings at said different levels, respectively, one of said pair of openings being disposed at a level intermediate the levels of adjacent pairs of openings and providing means for the flow into and out of said chamber of the sample liquid to be subjected to electrophoretic separation in said chamber, and the other pairs of openings providing for the flow into and out of said chamber of buffer liquids below and above the sample liquid and to provide a density gradient for the electrophoretic migration of ions from the sample liquid in the chamber to different levels, means for effecting an intermittent flow of all of said liquids simultaneously into and out of said chamber through said pairs of openings, respectively, means for subjecting the sample liquid to electrophoretic separation in said chamber during at least part of the interval of liquid-flow interruption, said chamber being light permeable in at least the region of electrophoretic separation of at least some of the ions of the sample liquid, means including a source of light for scanning said region of the chamber, and means operable in response to the operation of said scanning means for recording the scan of said region.

24. Electrophoresis apparatus, comprising an electrophoresis cell having a liquid chamber provided with horizontally spaced liquid inlet means and liquid outlet means, said liquid inlet means comprising a plurality of inlet openings disposed laterally of each other at different levels, said liquid outlet means comprising a plurality of outlet openings disposed laterally of each other at different levels, said inlet and outlet openings being arranged in pairs of openings at said different levels, respectively, one of said pair of openings being disposed at a level intermediate the levels of adjacent pairs of openings and providing means for the flow into and out of said chamber of the sample liquid to be subjected to electrophoretic separation in said chamber, and the other pairs of openings providing for the flow into and out of said chamber of buffer liquids below and above the sample liquid and to provide a density gradient for the electrophoretic migration of ions from the sample liquid in the chamber to different levels, pump means for effecting an intermittent flow of all of said liquids simultaneously into and out of said chamber through said pairs of openings, respectively, means for applying a voltage to the liquid in said chamber for inducing said electrophoretic migration of the ions, said chamber being light permeable in at least the region of electrophoretic separation of at least some of the ions of the sample liquid, means including a source of light for scanning said region of the chamber, means operable in response to the operation of said scanning means for recording the scan of said region, and programming means for automatically controlling the sequence of operations of said pumping means, the application of said voltage for said electrophoretic separation, and said scanning and recording operations.

25. Electrophoresis apparatus, comprising an electrophoresis cell having a liquid chamber provided with horizontally spaced liquid inlet means and liquid outlet means, said liquid inlet means comprising a plurality of inlet opening disposed laterally of each other at different levels, said liquid outlet means comprising a plurality of outlet openings disposed laterally of each other at different levels, said inlet and outlet openings being arranged in pairs of openings at said different levels, respectively, one of said pair of openings being disposed at a level intermediate the levels of adjacent pairs of openings and providing means for the flow into and out of said chamber of the sample liquid to be subjected to electrophoretic separation in said chamber, and the other pairs of openings providing for the flow into and out of said chamber of buffer liquids below and above the sample liquid and to provide a density gradient for the electrophoretic migration of ions from the sample liquid in the chamber to different levels, means for effecting an intermittent flow of all of said liquids simultaneously into and out of said chamber through said pairs of openings, respectively, means for automatically supplying each of a series of individual samples to said chamber during each companionate flow of the buffer liquids into the chamber, means for subjecting the sample liquid to electrophoretic separation in said chamber during at least part of the interval of liquid-flow interruption, said chamber being light permeable in at least the region of electrophoretic separation of at least some of the ions of the sample liquid, means including a source of light for scanning said region of the chamber, and means operable in response to the operation of said scanning means for recording the scan of said region.

26. Electrophoresis apparatus, comprising an electrophoresis cell having a liquid chamber provided with horizontally spaced liquid inlet means and liquid outlet means, said liquid inlet means comprising a plurality of inlet openings disposed laterally of each other at different levels, said liquid outlet means comprising a plurality of outlet openings disposed laterally of each other at different levels, said inlet and outlet openings being arranged in pairs of openings at said different levels, respectively, one of said pair of openings being disposed at a level intermediate the levels of adjacent pairs of openings and providing means for the flow into and out of said chamber of the sample liquid to be subjected to electrophoretic separation in said chamber, and the other pairs of openings providing for the flow into and out of said chamber of buffer liquids below and above the sample liquid and to provide a density gradient for the electrophoretic migration of ions from the sample liquid in the chamber to different levels, means for effecting an intermittent flow of all of said liquids simultaneously into and out of said chamber through said pairs of openings, respectively, means for automatically supplying each of a series of individual samples to said chamber during each companionate flow of the buffer liquids into the chamber, means for subjecting the sample liquid to electrophoretic separation in said chamber during at least part of the interval of liquid-flow interruption, said chamber being light permeable in at least the region of electrophoretic separation of at least some of the ions of the sample liquid, means including a source of light for scanning said region of the chamber, means operable in response to the operation of said scanning means for recording the scan of said region, and programming means for automatically controlling the sequence of said sample and companionate buffer flow into and out of said chamber and the application of the voltage for the electrophoretic separation of each of the samples.

27. Electrophoresis apparatus, comprising an electrophoresis cell having a liquid chamber provided with horizontally spaced liquid inlet means and liquid outlet means, said liquid inlet means comprising a plurality of inlet openings disposed laterally of each other at different levels, said liquid outlet means comprising a plurality of outlet openings disposed laterally of each other at different levels, said inlet and outlet openings being arranged in pairs of openings at said different levels, respectively, one of said pair of openings being disposed at a level intermediate the levels of adjacent pairs of openings and providing means for the flow into and out of said chamber of the sample liquid to be subjected to electrophoretic separation in said chamber, and the other pairs of openings providing for the flow into and out of said chamber of buffer liquids below and above the sample liquid and to provide a density gradient for the electrophoretic migration of ions from the sample liquid in the chamber to different levels, means for effecting an intermittent flow of all of said liquids simultaneously into and out of said chamber through said pairs of openings, respectively, means for automatically supplying each of a series of individual samples to said chamber during each companionate flow of the buffer liquids into the chamber, means for subjecting the sample liquid to electrophoretic separation in said chamber during at least part of the interval of liquid-flow interruption, said chamber being light permeable in at least the region of electrophoretic separation of at least some of the ions of the sample liquid, means including a source of light for scanning said region of the chamber, means operable in response to the operation of said scanning means for recording the scan of said region, and programming means for automatically controlling the sequence of said sample and companionate buffer flow into and out of said chamber and the application of the voltage for the electrophoretic separation of each of the samples, and said scanning and recording operations.

References Cited by the Examiner

UNITED STATES PATENTS

| | | | |
|---|---|---|---|
| Re.23,653 | 5/1953 | Stern | 204—180 |
| 2,412,602 | 12/1946 | Chambers et al. | 204—180 |
| 2,456,185 | 12/1948 | Grube | 204—214 |
| 2,675,734 | 4/1954 | Hasler et al. | 88—14 |
| 2,680,989 | 6/1954 | Santizky | 23—253 |
| 2,762,254 | 9/1956 | Kegeles | 204—180 |
| 2,811,202 | 10/1957 | Schild et al. | 23—253 |
| 2,817,264 | 12/1957 | Pearson | 204—180 |
| 2,878,178 | 3/1959 | Bier | 204—180 |
| 2,879,141 | 3/1959 | Skeggs | 23—253 |
| 2,885,922 | 5/1959 | Miller | 23—253 |
| 2,899,280 | 8/1959 | Whitehead et al. | 23—230 |
| 2,982,170 | 5/1961 | Wyss | 88—14 |
| 3,019,091 | 1/1962 | Schneider | 23—253 |
| 3,025,227 | 3/1962 | Kollsman | 204—180 |
| 3,059,524 | 10/1962 | Grassmann et al. | 23—253 |
| 3,135,816 | 6/1964 | Ram et al. | 204—180 |

JOHN H. MACK, *Primary Examiner.*

MURRAY TILLMAN, JOHN R. SPECK, *Examiners.*

G. KAPLAN, J. BATTIST, E. ZAGARELLA,
*Assistant Examiners.*